(12) United States Patent (10) Patent No.: US 6,997,764 B2
Okuyama et al. (45) Date of Patent: Feb. 14, 2006

(54) OUTBOARD MOTOR IDENTIFICATION NUMBER SETTING DEVICE AND SYSTEM

(75) Inventors: Takashi Okuyama, Hamamatsu (JP); Masaru Kawanishi, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/999,039

(22) Filed: Nov. 29, 2004

(65) Prior Publication Data

US 2005/0118896 A1 Jun. 2, 2005

(30) Foreign Application Priority Data

Nov. 28, 2003 (JP) .............................. 2003-400617

(51) Int. Cl.
*B60L 1/14* (2006.01)
(52) U.S. Cl. ............................................ 440/2; 701/21
(58) Field of Classification Search .................... 440/1, 440/2, 84; 60/719; 701/21, 27
See application file for complete search history.

(56) References Cited

U.S. PATENT DOCUMENTS

| | | | |
|---|---|---|---|
| 5,069,154 A | * | 12/1991 | Carter ............................ 440/1 |
| 5,209,682 A | * | 5/1993 | Duning et al. .................. 440/2 |
| 6,273,771 B1 | * | 8/2001 | Buckley et al. ................ 440/84 |
| 6,587,765 B1 | * | 7/2003 | Graham et al. ................ 701/21 |
| 6,872,106 B2 | * | 3/2005 | Kanno ............................ 440/2 |
| 2003/0082962 A1 | | 5/2003 | Kanno |
| 2003/0093196 A1 | | 5/2003 | Okuyama |

FOREIGN PATENT DOCUMENTS

JP 2003-127985 5/2003

* cited by examiner

*Primary Examiner*—Lars A. Olson
(74) *Attorney, Agent, or Firm*—Knobbe, Martens, Olson & Bear, LLP

(57) ABSTRACT

A vehicle can have plural propulsion devices, at least two of which include number setting sections and number transmitting/receiving sections for transmitting their identification number and receiving identification numbers of the other propulsion devices over a network. When the number transmitting/receiving sections do not receive an identification number of another propulsion device from the network for a predetermined period of time, an initial value preset in the number setting sections is set as the identification number of the propulsion device in the number setting sections. When the number transmitting/receiving sections receive an identification number of another propulsion device from the network, an identification number different from the identification number of the other propulsion device is set in the number setting sections.

12 Claims, 3 Drawing Sheets

US 6,997,764 B2

OUTBOARD MOTOR IDENTIFICATION NUMBER SETTING DEVICE AND SYSTEM

PRIORITY INFORMATION

This application is based on and claims priority to Japanese Patent Application No. 2003-400617, filed Nov. 28, 2003, the entire contents of which is hereby expressly incorporated by reference.

BACKGROUND OF THE INVENTIONS

1. Field of the Inventions

The present inventions relate to the transmission and reception of various signals over network, and more particularly, for an identification number setting device for a a vehicle such as a boat which includes plural propulsion devices, such as outboard motors.

2. Description of the Related Art

A number of techniques are known for connecting an outboard motor of a boat to various gauges, steering devices and throttle levers. In the oldest techniques, such devices were connected with individual signal lines for transmission of control signals and detection signals.

When the devices are connected with individual signal lines, every associated pair of devices requires a separate signal line. Thus a large number of signal lines can be required. As an alternative to such hard-wired systems, CANs (control area networks) are often used. In a CAN, various devices are connected to a single network cable, through which various information can be transmitted between those devices.

A CAN is a network system, for incorporating intelligent devices within a system, such as various sensors and actuators, into a network. See ISO 11898. Such network systems can have a high transmission rate and a wide range of temperature and humidity, superior security, provide reliable real-time performance, and can be resistant to interference, vibration and electromagnetic radiation.

Where a boat includes plural outboard motors connected with a CAN as described above, the outboard motors can be preset with different identification numbers. The identification numbers are added to engine control signals and detection signals. For example, such signals can be in the form of data packets with the outboard motor indentification number included in each packet. Such packets can be transmitted across the CAN, indentification number serving as an indication of the source of the packet.

SUMMARY OF THE INVENTION

In order to set identification numbers for outboard motors, different identification numbers can be assigned to each of the outboard motors, for example, and be stored in the outboard motors and associated devices. Therefore, under conventional techniques, when such outboard motors were mounted onto a hull, special setting operations were used. For example, the cowlings of the outboard motors were removed to perform the setting operation on their ECUs using a special jig. Such operations were troublesome and time-consuming.

As an alternative to giving identification numbers to outboard motors themselves, the CAN was formed with hub units that had pre-numbered ports. Thus, each of the outboard motors could be identified by the port to which it was connected. However, this type of hub unit must be provided with a processor, memory storage and the like, which complicates its configuration and increases its cost.

Thus, in accordance with one embodiment, an outboard motor identification number setting device provided in an outboard motor connected to a network, comprises a number setting section configured to set an identification number of the outboard motor, and a number transmitting/receiving section configured to transmit the identification number set by the number setting section and to receive an identification number of another outboard motor via the network. The number transmitting/receiving section is configured such that when the number transmitting/receiving section does not receive an identification number of another outboard motor from the network for a predetermined period of time, an initial value preset in the number setting section is set as the identification number of the outboard motor in the number setting section. Additionally, The number transmitting/receiving section is configured such that when the number transmitting/receiving section receives an identification number of the another outboard motor from the network, an identification number different from the identification number of another outboard motor is set in the number setting section.

In accordance with another embodiment, a boat includes a hull and a plurality of outboard motors supported by the hull and connected by a network. At least two of the outboard motors include an outboard motor identification number setting device. Each of the outboard motor identification number setting devices comprise a number setting section configured to set an identification number of the outboard motor, and a number transmitting/receiving section configured to transmit the identification number set by the number setting section and to receive an identification number of another outboard motor via the network. The number transmitting/receiving section is configured such that when the number transmitting/receiving section does not receive an identification number of another outboard motor from the network for a predetermined period of time, an initial value preset in the number setting section is set as the identification number of the outboard motor in the number setting section. The number transmitting/receiving section also is configured such that when the number transmitting/receiving section receives an identification number of the another outboard motor from the network, an identification number different from the identification number of another outboard motor is set in the number setting section.

In accordance with yet another embodiment, a vehicle includes a plurality of propulsion devices connected by a network, each of the propulsion devices including an identification number setting device. Each of the identification number setting devices comprises a number setting section configured to set an identification number of the propulsion device, and a number transmitting/receiving section configured to transmit the identification number set by the number setting section and to receive an identification number of another propulsion device via the network. The number transmitting/receiving section is configured such that when the number transmitting/receiving section does not receive an identification number of another propulsion device from the network for a predetermined period of time, an initial value preset in the number setting section is set as the identification number of the propulsion device in the number setting section. Additionally, the number transmitting/receiving section also is configured such that when the number transmitting/receiving section receives an identification number of the another propulsion device from the network, an identification number different from the identification number of another propulsion device is set in the number setting section.

DETAILED DESCRIPTION OF THE PREFERRED EMBODIMENT

Figure 1:
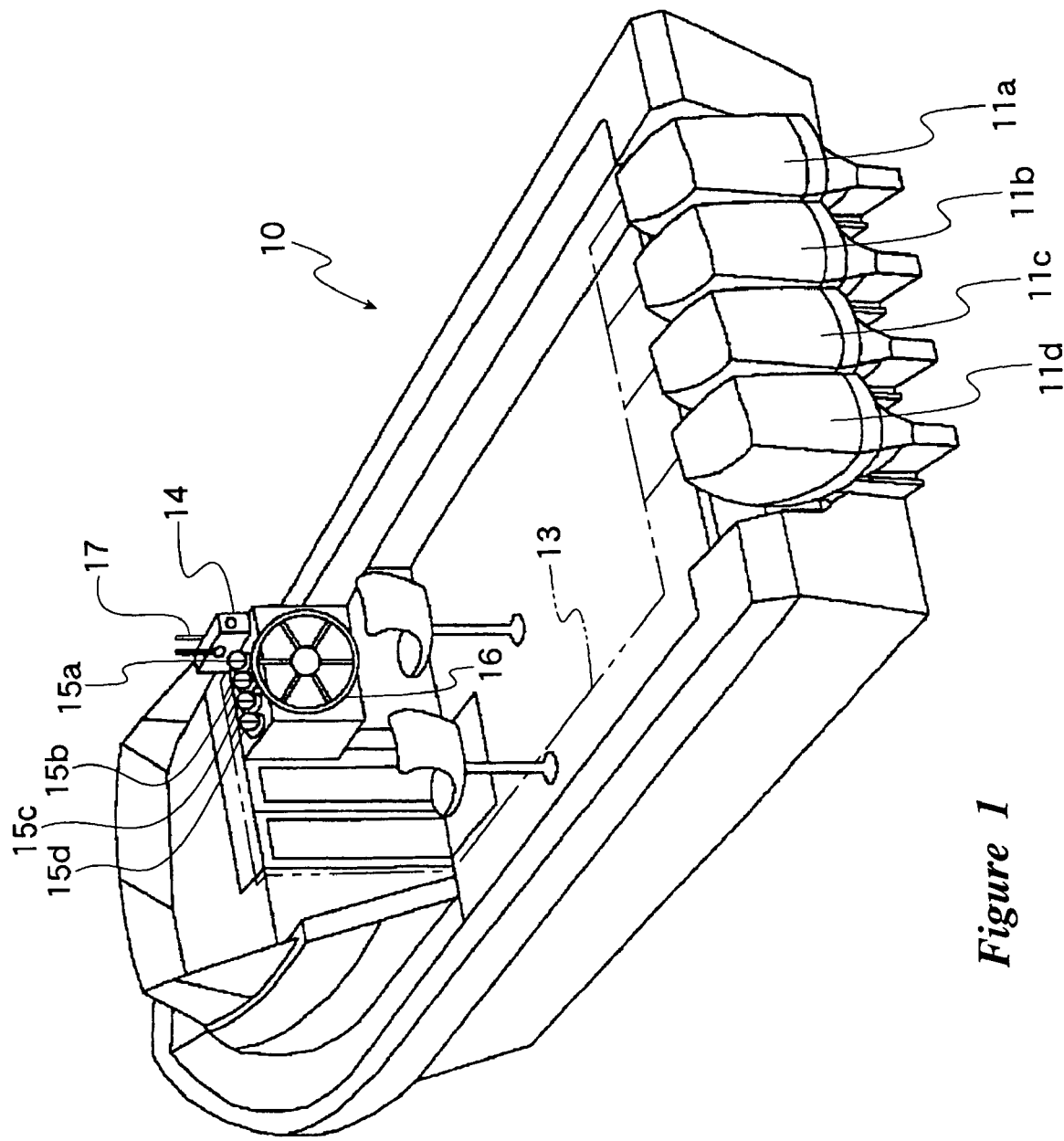
FIG. 1 is a perspective view of a boat including an outboard motor identification number setting device according to one embodiment.

FIG. 1 is a schematic structural view of a marine propulsion system included on a small boat 10. The embodiments disclosed herein are described in the context of a marine propulsion system of a small boat because these embodiments have particular utility in this context. However, the embodiments and inventions herein can also be applied to other marine vessels, such as personal watercraft and small jet boats, as well as other vehicles having multiple propulsion units.

The present marine propulsion system includes a number setting section adapted to be set with an identification number of an outboard motor. The number transmitting/receiving section is adapted to transmit the identification number to a network and receive an identification number of another outboard motor. Therefore, when outboard motors are connected to a network and their number setting sections and number transmitting/receiving sections are sequentially activated, the number transmitting/receiving section of an outboard motor activated later can receive an identification number different from the number assigned to the previously activated outboard motor(s).

In some embodiments, when the number transmitting/receiving section does not receive an identification number of another outboard motor for a predetermined period of time, an initial preset value in the number setting section is set in the number setting section. On the other hand, when the number transmitting/receiving section receives an identification number of another outboard motor, an identification number different from the identification number of a previously activated outboard motor is set in the number setting section. Therefore, by sequentially activating respective number setting sections and number transmitting/receiving sections of plural outboard motors, a later-activated outboard motor can be securely and automatically set with an identification number different from the identification number of a previously-activated outboard motor, without special setting operations for setting identification numbers.

Figure 2:
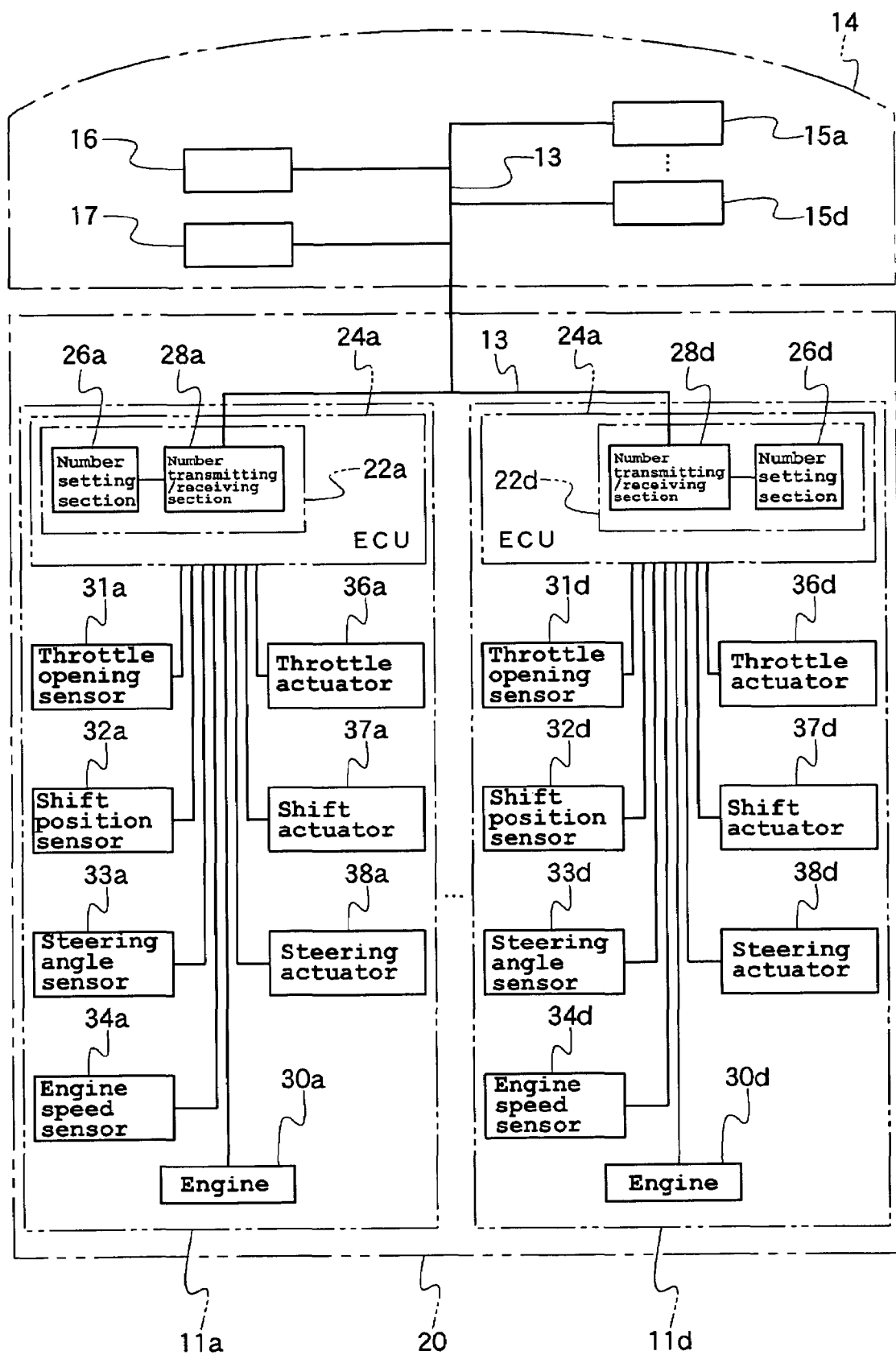
FIG. 2 is a block diagram of a portion of the an outboard motor identification number setting system shown in FIG. 1.
Figure 3:
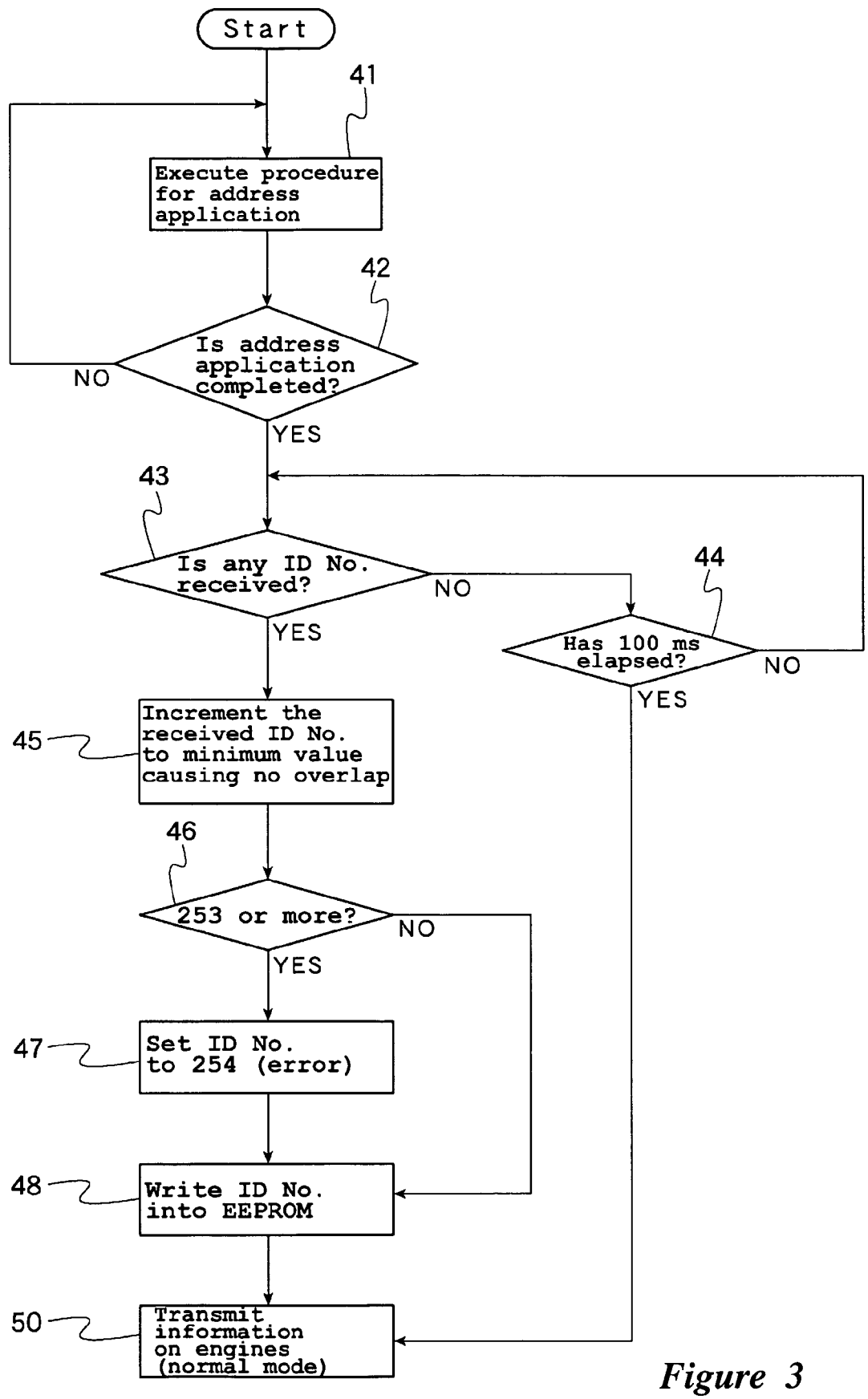
FIG. 3 is a flowchart of an outboard motor identification number setting method according to another embodiment.

FIGS. 1 through 3 show non-limiting embodiments of the present inventions. In FIG. 1, reference numeral 10 denotes a boat having at the rear of its hull, plural propulsion units. In this embodiment, the propulsion units are outboard motors 11a to 11d. However, other types of propulsion units can also be used on boats, or other types of vehicles.

As shown in FIGS. 1 and 2, an onboard network system is installed in the boat 10. The onboard network system can be in the form of a CAN. The four outboard motors 11a to 11d are connected to a network cable 13 of the CAN. Engine condition indicators 15a to 15d for indicating information on engine conditions of the outboard motors 11a to 11d, a steering device 16, a remote control 17 and the like for controlling the boat, and various unillustrated intelligent devices are connected to the network cable 13 in a boat controlling section 14 located on the front side of the hull. In the illustrated embodiment, the front side of the hull can also be referred to as an operator's area.

In such an onboard network system, various signals are transmitted via the single network cable 13. The outboard motors 11a to 11d can transmit and receive various signals to and from the engine condition indicators 15a to 15d, the steering device 16, and the remote control 17 in a one-to-one or a one-to-many relationship. For example, each the engine condition indicators 15a to 15d can be configured to display information from only one of the outboard motors 11a to 11d, respectively; a "one-to-one relationship". Additionally, one of the throttle control levers included in the remote control 17 can be configured to output throttle control data to two or more of the outboard motors 11a to 11d; a "one-to-many relationship". To this end, different identification numbers are assigned to each the outboard motors 11a to 11d.

In the embodiment of FIG. 2, an outboard motor identification number setting system 20 is configured to set different identification numbers for each of the four outboard motors 11a to 11d. Note that in FIG. 2, two outboard motors 11b and 11c, and two engine condition indicators, 15b and 15c, are omitted for simplification.

In the outboard motor identification number setting system 20, identification number setting devices 22a to 22d, provided respectively in the outboard motors 11a to 11d, are connected to the network cable 13.

The identification number setting devices 22a to 22d are respectively provided in ECUs 24a to 24d. The ECUs 24a to 24d are configured to control operation of the engines 30a to 30d of the outboard motors 11a to 11d. The ECUs 24a to 24d also include number setting sections 26a to 26d, respectively. The number setting sections 26a to 26d are configured to set a different identification number for each of the outboard motors 11a to 11d.

The ECUs 24a to 24d also include number transmitting/receiving sections 28a to 28d, respectively. The number transmitting/receiving sections 28a to 28d are configured to transmit and receive, via the network cable 13, the identification number of the outboard motors 11a to 11d set by the number setting sections 26a to 26d. Additonally, the outboard motors 11a to 11d can include activating sections (not shown). The activating sections can be in the form of an engine switch or a switch configured to be activated upon detecting a predetermined number of engine revolutions. Such activating sections can be configured to activate the number setting sections 26a to 26d and the number transmitting/receiving sections 28a to 28d.

In addition to the identification number setting devices 22a to 22d, sensors for detecting engine conditions are also connected to the ECUs 24a to 24d for detecting engine conditions. For example, the ECUs 24a to 24d can be configured to detect the output from throttle opening sensors 31a to 31d, shift position sensors 32a to 32d, steering angle sensors 33a to 33d, and engine speed sensors 34a to 34d. In addition, to the ECUs 24a to 24d can be connected operating sections of the engines 30a to 30d, such as throttle actuators 36a to 36d, shift actuators 37a to 37d, and steering actuators 38a to 38d.

Each of the identification number setting devices 22a to 22d can be preloaded with a program configured to perform processes. One such exemplary process is ilustrated in the flow chart of FIG. 3. This process can be performed when the identification number setting devices 22a to 22d are activated by their respective activating sections. In some embdoiments, the number setting sections 26a to 26d of the identification number setting devices 22a to 22d can each be preset with an initial value as its identification number.

In order to set identification numbers for the plural outboard motors 11a to 11d using the program, the activating sections are activated, one by one sequentially from the right, for example.

When the identification number setting device 22a of a first outboard motor 11a is activated, an address application can be made in step 41. In Step 42, it is determined whether or not the address application is completed. If the address application is not completed, the process returns to step 41. When the address application is completed, the process goes to step 43.

In step 43, it is determined whether or not the identification numbers of the other outboard motors 11b to 11d are received. If there are no such identification numbers received, the process goes to step 44, where it is determined whether or not a predetermined period of time has elapsed. The predetermined time period can be any time period. In an exemplary embodiment, the predetermined time period can be 100 ms. The process returns to step 43 if the time period has not elapsed, and proceeds to step 50 if the time period has elapsed.

When the process initially runs, only the activating section for the first outboard motor 11a is activated. Thus, there are no identification numbers transmitted from the other outboard motors 11b to 11d. Therefore, there are no identification numbers of the other outboard motors 11b to 11d received by the number transmitting/receiving section 28a via the network cable 13. In this situation, when the time period (100 ms) has elapsed in step 44, the process proceeds to step 50 and the identification number setting device 22a enters the normal mode. This allows the initial value for the identification number preset in the number setting section 26a to be set as the identification number of the outboard motor 11a in the number setting section 26a, and allows the set identification number to be transmitted from the number transmitting/receiving section 28a to the network cable 13. The identification number will thereafter continue to be transmitted, either continuously or intermittently.

Note that a complex number PGN, which can be a combined form of an identification number and other numbers indicating various information on engine conditions, is used in this embodiment. Thus, the identification number transmitted from the number transmitting/receiving section 28a is included in a complex number PGN as part thereof. The complex number PGN can also be referred to as a "packet".

After the identification number of the outboard motor 11a is set, the activating section for the outboard motor 11b disposed adjacent to the outboard motor 11a can be activated. Then, the processing program shown in FIG. 3 is run for the identification number setting device 22b of the outboard motor 11b.

Thus, an address application is made for the identification number setting device 22b in step 41 and a determination is made in step 42. When the address application is completed, the process proceeds to step 43. In the step 43 it is determined whether or not identification numbers of the other outboard motors 11a, 11c and 11d are received. Here, since the outboard motor 11a is already activated, the number transmitting/receiving section 28b receives a complex number PGN including the identification number of the outboard motor 11a via the network cable 13. Thus, the process proceeds to step 45.

In step 45, a number is obtained by increasing the identification number indicated as part of the complex number PGN of the outboard motor 11a by a minimum value, or by incrementing the indicated identification number. The process then goes to step 46, where it is determined whether or not the incremented number is a maximum value. In an exemplary embodiment, the maximum value can be 253, however, higher or lower numbers can also be used. If the incremented number is 253 or more, the process goes to step 47, where the number "254" is set in the number setting section 26b.

If the incremented number is less than 253 in step 46, the process goes to step 48, where the number obtained by incrementing the identification number of the outboard motor 11a is stored in a memory as the identification number of the outboard motor 11b. In an exemplary embodiment, the memory can be in the form of an EEPROM of the number setting section 26b. Thus, the identification numbers of the outboard motors 11a and 11b are set as consecutive numbers.

The process then goes to step 50, where the identification number setting device 22b enters the normal mode, in which a complex number PGN including the identification number of the outboard motor 11b is transmitted, either continuously or intermittently, from the number transmitting/receiving section 28b to the network cable 13. Note that, at this time, the complex number PGN of the outboard motor 11a continues to be transmitted from the number transmitting/receiving section 28a of the outboard motor 11a.

After the identification numbers of the outboard motors 11a and 11b are set in this manner, the processing program shown in FIG. 3 is run for the outboard motors 11c and 11d by sequentially activating the identification number setting devices 22c and 22d. Thus, an identification number can be automatically set for each of the outboard motors 11c and 11d, as in the case of the outboard motor 11b.

At this time, since the outboard motors 11a and 11b, with their identification numbers set as noted above, continue to transmit their complex numbers PGN including their respective identification numbers, the number transmitting/receiving sections 28c and 28d receive the complex numbers PGN of the outboard motors 11a and 11b via the network cable 13 in step 43. Thus, identification numbers consecutive to the identification numbers of the outboard motors 11a and 11b are set in steps 45, 46 and 48.

When the setting of identification numbers cannot be executed properly, the identification numbers of the outboard motors 11a to 11d set in the number setting sections 26a to 26d can be reset. For example, an operation on the engine condition indicators 15a to 15d or through an operation with other tools can be performed to restore their initial states (default states). The initial value for the identification number in the number setting section 26a may be 0, for example. The resetting may be executed manually, independently of the above program. However, other methods can also be used. After the resetting, the program of FIG. 3 is run, again from the first outboard motor 11a.

After setting identification numbers, different from each other, for all the outboard motors 11a to 11d in this manner, the outboard motors 11a to 11d are associated with other devices, such as the engine condition indicators 15a to 15d, using the identification numbers of the outboard motors 11a to 11d. In other words, transmission and reception of various information such as detection values and set values is enabled between the outboard motors 11a to 11d located at specified positions and other corresponding devices such as the engine condition indicators 15a to 15d.

In this case, since the identification numbers of the outboard motors 11*a* to 11*d* are set sequentially from the right (as viewed in FIG. 1), other devices such as the engine condition indicators 15*a* to 15*d* can be selectively associated with the outboard motors of small to large, sequential identification numbers, for example. It is also possible to allow other devices such as the engine condition indicators 15*a* to 15*d* to store the identification numbers of the outboard motors 11*a* to 11*d*, by sequentially connecting them to the network cable 13, or bringing them into settable conditions, on each activation of the activating sections of the outboard motors 11*a* to 11*d*.

In this manner, the outboard motors 11*a* to 11*d* and the engine condition indicators 15*a* to 15*d* are associated in pairs using identification numbers, and the identification numbers are added to various information transmitted and received between the outboard motors 11*a* to 11*d* and the engine condition indicators 15*a* to 15*d*. For example, the identification numbers are added to the packets transmitted from the engine condition indicators 15*a* to 15*d*. This allows transmission and reception of various information such as detection values and set values via the network cable 13.

When the plural outboard motors 11*a* to 11*d* connected to the network cable 13 are each given different identification numbers as described above, the identification numbers of the outboard motors 11*a* to 11*d* are respectively set in the number setting sections 26*a* to 26*d*. The number transmitting/receiving sections 28*a* to 28*d* transmit their identification number via the network cable 13 and receive identification numbers of the other outboard motors. Therefore, the identification number of an outboard motor activated earlier, 11*a* to 11*c*, can be received by the number transmitting/receiving section, 28*b* to 28*d*, of an outboard motor activated later, 11*b* to 11*d*.

With this configuration, when the number transmitting/receiving sections 28*a* to 28*d* do not receive an identification number of another outboard motor for a predetermined period of time, an initial value preset in the number setting sections 26*a* to 26*d* is set in the number setting sections 26*a* to 26*d*. On the other hand, when the number transmitting/receiving sections 28*a* to 28*d* receive an identification number of another outboard motor, 11*a* to 11*d*, an identification number different from the identification number of the other outboard motor, 11*a* to 11*d*, is set in the number setting sections 26*a* to 26*d*. Therefore, by sequentially activating the number setting sections 26*a* to 26*d* and number transmitting/receiving sections 28*a* to 28*d* of the plural outboard motors 11*a* to 11*d*, a later-activated outboard motor 11*b* to 11*d*, can be securely and automatically set with an identification number different from the identification number of an earlier-activated outboard motor 11*a* to 11*c*, without special setting operations for setting identification numbers. This is accomplished with a simple configuration.

When the number transmitting/receiving section, 28*a* to 28*d*, receives an identification number of another outboard motor 11*a* to 11*d*, from the network cable 13, its identification number is set to a minimum value that does not conflict with the identification number of the other outboard motor 11*a* to 11*d*, obtained by increasing the received identification number. Therefore, the plural outboard motors 11*a* to 11*d* can be given small to large, sequential identification numbers in the order that their respective number setting sections 26*a* to 26*d* and number transmitting/receiving sections 28*a* to 28*d* are activated.

Further, since identification numbers can be automatically set with outboard motors alone, resetting of identification numbers is facilitated in the case of replacing the outboard motors 11*a* to 11*d*, for example. Therefore, replacement of the outboard motors 11*a* to 11*d* is also facilitated.

In addition, the number setting sections 26*a* to 26*d* of the outboard motors 11*a* to 11*d* are adapted to clear a previously set identification number to restore their initial conditions in response to a resetting operation. Therefore, previously set identification numbers can be changed in the case that an erroneous setting operation is performed during the setting of identification numbers, incorrect identification numbers are set, or when the outboard motors 11*a* to 11*d* are replaced.

In the above embodiment, identification numbers are set for the outboard motors 11*a* to 11*d* in their entirety. However, identification numbers may be set for the engines 30*a* to 30*d* (engine identification numbers), and/or for other discreet devices, parts, actuators, and/or sensors.

The outboard motors 11*a* to 11*d* are provided with an activating section for activating their respective number setting sections 26*a* to 26*d* and number transmitting/receiving sections 28*a* to 28*d* in the above embodiment. However, in some embodiments, activation of these devices may be triggered by different appropriate conditions requiring no special operations, such as only connecting them to the network cable 13, and observing a predetermined operating condition, such as a revolution of the engines 30*a* to 30*d*, for example.

In the above description, the initial values for the identification numbers of the outboard motors 11*a* to 11*d* are preset to the same value, or unset. However, they may be preset to different values.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An outboard motor identification number setting device provided in an outboard motor connected to a network, comprising:

a number setting section configured to set an identification number of the outboard motor; and a number transmitting/receiving section configured to transmit the identification number set by the number setting section and to receive an identification number of another outboard motor via the network;

the number transmitting/receiving section being configured such that when the number transmitting/receiving section does not receive an identification number of another outboard motor from the network for a predetermined period of time, an initial value preset in the number setting section is set as the identification number of the outboard motor in the number setting section; and the number transmitting/receiving section also being configured such that when the number transmitting/receiving section receives an identification number of the another outboard motor from the network, an identification number different from the identification number of another outboard motor is set in the number setting section.

2. The outboard motor identification number setting device according to claim 1, wherein the number transmitting/receiving section is configured such that when the number transmitting/receiving section receives an identification number of another outboard motor from the network, said different identification number is set to a minimum value which does not conflict with the identification number of the another outboard motor obtained by increasing the identification number of the another outboard motor.

3. The outboard motor identification number setting device according to claim 1, wherein the number setting section is configured to clear a previously set identification number and to restore its initial condition in response to a reset operation.

4. The outboard motor identification number setting device according to claim 2, wherein the number setting section is configured to clear a previously set identification number and to restore its initial condition in response to a reset operation.

5. A boat having a hull and a plurality of outboard motors supported by the hull and connected by a network, at least two of the outboard motors including an outboard motor identification number setting device each of which comprises:
   a number setting section configured to set an identification number of the outboard motor; and
   a number transmitting/receiving section configured to transmit the identification number set by the number setting section and to receive an identification number of another outboard motor via the network;
   the number transmitting/receiving section being configured such that when the number transmitting/receiving section does not receive an identification number of another outboard motor from the network for a predetermined period of time, an initial value preset in the number setting section is set as the identification number of the outboard motor in the number setting section; and
   the number transmitting/receiving section also being configured such that when the number transmitting/receiving section receives an identification number of the another outboard motor from the network, an identification number different from the identification number of another outboard motor is set in the number setting section.

6. The boat according to claim 5, wherein the number transmitting/receiving section is configured such that when the number transmitting/receiving section receives an identification number of another outboard motor from the network, said different identification number is set to a minimum value which does not conflict with the identification number of the another outboard motor obtained by increasing the identification number of the another outboard motor.

7. The boat according to claim 5, wherein the number setting section is configured to clear a previously set identification number and to restore its initial condition in response to a reset operation.

8. The boat according to claim 6, wherein the number setting section is configured to clear a previously set identification number and to restore its initial condition in response to a reset operation.

9. A vehicle having a plurality of propulsion devices connected by a network, each of the propulsion devices including an identification number setting device, each of which comprises:
   a number setting section configured to set an identification number of the propulsion device; and
   a number transmitting/receiving section configured to transmit the identification number set by the number setting section and to receive an identification number of another propulsion device via the network;
   the number transmitting/receiving section being configured such that when the number transmitting/receiving section does not receive an identification number of another propulsion device from the network for a predetermined period of time, an initial value preset in the number setting section is set as the identification number of the propulsion device in the number setting section; and
   the number transmitting/receiving section also being configured such that when the number transmitting/receiving section receives an identification number of the another propulsion device from the network, an identification number different from the identification number of another propulsion device is set in the number setting section.

10. The vehicle according to claim 9, wherein the number transmitting/receiving section is configured such that when the number transmitting/receiving section receives an identification number of another propulsion device from the network, said different identification number is set to a minimum value which does not conflict with the identification number of the another propulsion device obtained by increasing the identification number of the another propulsion device.

11. The vehicle according to claim 9, wherein the number setting section is configured to clear a previously set identification number and to restore its initial condition in response to a reset operation.

12. The vehicle according to claim 10, wherein the number setting section is configured to clear a previously set identification number and to restore its initial condition in response to a reset operation.

* * * * *